(12) United States Patent
Daniels

(10) Patent No.: US 9,051,087 B1
(45) Date of Patent: Jun. 9, 2015

(54) SANITARY COVER FOR AIRPLANE TRAY INCLUDING POCKET FOR PERSONAL USE

(76) Inventor: Jack Daniels, Agoura Hills, CA (US)

( * ) Notice: Subject to any disclaimer, the term of this patent is extended or adjusted under 35 U.S.C. 154(b) by 0 days.

(21) Appl. No.: 12/218,133

(22) Filed: Jul. 10, 2008

Related U.S. Application Data

(60) Provisional application No. 60/949,236, filed on Jul. 11, 2007.

(51) Int. Cl.
*B65D 33/00* (2006.01)

(52) U.S. Cl.
CPC ........................................ *B65D 33/00* (2013.01)

(58) Field of Classification Search
CPC ...... F16L 59/161; F16L 59/026; F16L 59/168
USPC ............ 150/154, 156; 297/183.4, 256.16, 45, 297/225, 228.11, 188.01, 219.1; 280/33.992, 47.38
See application file for complete search history.

(56) References Cited

U.S. PATENT DOCUMENTS

| | | | | |
|---|---|---|---|---|
| 3,309,007 | A  * | 3/1967 | Rosenberg et al. | 383/9 |
| D293,626 | S  * | 1/1988 | Beran | D3/290 |
| 5,090,559 | A  * | 2/1992 | Gendreau | 206/278 |
| 5,265,933 | A  * | 11/1993 | Croshaw | 297/228.1 |
| D451,882 | S  * | 12/2001 | Hassett et al. | D12/416 |
| 6,428,098 | B1 * | 8/2002 | Allbaugh | 297/219.12 |
| 6,481,793 | B1 * | 11/2002 | Horn | 297/228.1 |
| 6,676,210 | B1 * | 1/2004 | Peyton | 297/219.12 |
| 6,848,743 | B1 * | 2/2005 | Collins | 297/256.17 |
| 6,929,326 | B2 * | 8/2005 | Cohen-Fyffe | 297/219.12 |
| D538,573 | S  * | 3/2007 | Allen | D6/611 |
| 7,192,190 | B2 * | 3/2007 | Jung | 383/22 |
| 7,204,551 | B2 * | 4/2007 | Kahan | 297/184.11 |
| 7,367,621 | B1 * | 5/2008 | Han-Dressor et al. | 297/256.17 |
| 7,398,977 | B2 * | 7/2008 | Short | 280/33.992 |
| 7,444,701 | B2 * | 11/2008 | Ashley | 5/655 |
| 2005/0111763 | A1 * | 5/2005 | Jung | 383/22 |
| 2009/0188881 | A1 * | 7/2009 | Travis | 211/131.1 |

\* cited by examiner

*Primary Examiner* — Fenn Mathew
*Assistant Examiner* — Cynthia Collado
(74) *Attorney, Agent, or Firm* — Cislo & Thomas, LLP

(57) ABSTRACT

A sanitary pocket that fits over the tray table on a commercial airplane flight having two parts wherein the first part slips over the tray when it is its horizontal position. When the tray is returned to its upright vertical position, the first pocket is held in place by the securing device that secures the tray in its upright position while a second pocket hangs down from the first pocket that allows the traveler to place his or her items therein, with the peace of mind of knowing that the pocket has not been previously used by an uncountable number of persons and that the pocket is as clean and sanitary as the user dictates. Furthermore, advertising could be displayed on the pocket when in the upright position. Additionally, graphics, including game boards could be used on the first pocket when the tray is in the in-use position allowing for games, as well as providing a clean tablecloth for the user.

8 Claims, 2 Drawing Sheets

SANITARY COVER FOR AIRPLANE TRAY INCLUDING POCKET FOR PERSONAL USE

REFERENCE TO PRIOR APPLICATION

This application claims the priority of provisional application 60/949,236, filed Jul. 11, 2007 entitled SANITARY COVER THAT GOES OVER AN AIRPLANE TRAY TABLE THAT ALSO HAS A POCKET TO HOLD PERSONAL ITEMS by Jack Daniels.

BACKGROUND OF THE INVENTION

1. Field of the Invention

The present invention relates generally to the field of traveling accessories and particularly toward a sanitary cover pocket that can be placed over commercial airline trays that allows the tray to stay sanitary and that provides a sanitary pocket for the placement therein by the passenger of personal items.

2. Description of the Prior Art

Travelers who travel by air are well acquainted with the tray tables that are attached to the back of each chair for use by the traveler seated behind that chair. Also on the back of each airline chair is a pocket that has placed therein barf bags, magazines, catalogs, headphones, pillows and other items provided by the airline for the comfort of the traveler.

When it is time to use the tray as a table, either for eating, writing, reading, playing games, etc., the tray is released through a securing mechanism from its vertical, upright position into a horizontal position that allows the tray to act as a table that the traveler may need for a variety of activities. Typically, one airplane flies to one destination, unloads its passengers and freight, goes through a cursory cleaning and then boards a new set of passengers and freight for another flight. This routine repeats many times throughout a given day, depending upon how far the airplane flies.

Concerned travelers rightfully have no real reassurance as to the sanitary state of the tray and the pocket after use by uncountable number of passengers. Furthermore, the pocket on the back of the seat is of limited space and is already consumed with the aforementioned items provided by the airline. If a passenger had a lot of his or her own items to store, the provided pocket is often of inadequate size. Furthermore, there are justifiably sanitary concerns as to what may have previously been placed in the pocket.

There is a need for a device that can overcome the problem of pocket space and sanitation concerns.

It is the object of the instant invention to provide a sanitary cover for the tray so that when it is time to use the tray, the sanitation is assured to the passenger through the passenger's own use and care of the cover.

It is yet another object of the invention to provide a personal pocket for the traveler for the placement therein of personal items without concern from the sanitary condition of the pocket or the space available for storage.

SUMMARY OF THE INVENTION

The preferred embodiment of the present invention teaches a sanitary protective cover for placement over an airline tray comprising a first pocket further comprising a front face; a rear face; at least one sidewall; and an access slot having an edge that connects it to the front face wherein the front face, the rear face, the at least one sidewall, and the access slot combine to create an interior space of sufficient size and dimension as to allow the first pocket to fit over an airline tray; a second pocket further comprising a front face; a rear face; at least one sidewall; and an access slot having an edge that connects it to the front face of the first pocket wherein the front face, the rear face, the at least one sidewall, and the access slot combine to create a pocket for the placement therein of personal items.

The above embodiment can be further modified by defining that either the front or rear face of the first or second pocket contains a space that can be utilized to display an image.

The above embodiment can be further modified by defining that the cover is made of a stretchy fabric.

The above embodiment can be further modified by defining that the second pocket can be divided through one or more barriers to create two or more pockets.

An alternate embodiment of the instant invention teaches a method of sanitizing an airplane tray and providing extra sanitary storage space to an airplane traveler comprising the steps of obtaining a sanitary protective cover, the sanitary protective cover further comprising a first pocket further comprising a front face; a rear face; at least one sidewall; and an access slot having an edge that connects it to the front face wherein the front face, the rear face, the at least one sidewall, and the access slot combine to create an interior space of sufficient size and dimension as to allow the first pocket to fit over an airline tray; a second pocket further comprising a front face; a rear face; at least one sidewall; and an access slot having an edge that connects it to the front face of the first pocket wherein the front face, the rear face, the at least one sidewall, and the access slot combine to create a pocket for the placement therein of personal items; locating the airplane tray in the upright, vertical position; releasing the airplane tray to be moved into the horizontal position; and slipping the first pocket of the sanitary cover over the airplane tray through the access slot in the first pocket.

The above embodiment can be further modified by defining that the method includes the further step of removing the airplane tray to the upright, vertical position and securing it thereto, thereby providing the second pocket as a place to house a traveler's personal items.

The above embodiment can be further modified by defining that either the front face or the rear face of the first or second pocket contains a space that can be utilized to display an image.

The above embodiment can be further modified by defining that the cover is made of a stretchy fabric.

The above embodiment can be further modified by defining that the second pocket can be divided through one or more barriers to create two or more pockets.

DETAILED DESCRIPTION OF A PREFERRED EMBODIMENT

Figure 1:
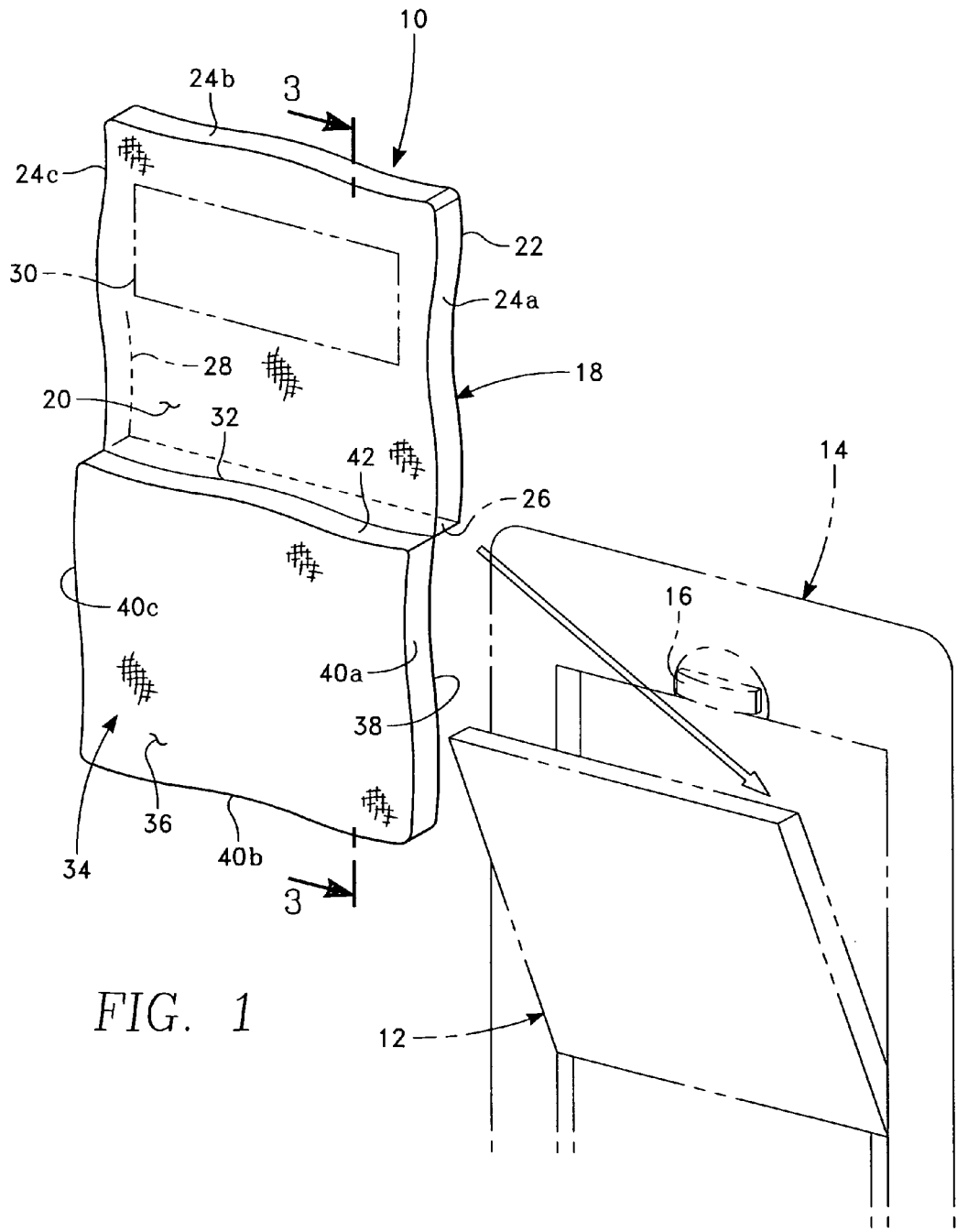
FIG. 1 is a perspective view of the apparatus and how it fits around a tray found on a typical commercial airline flight.

Turning to the drawings, the preferred embodiment is illustrated and described by reference characters that denote similar elements throughout the several views of the instant invention.

The preferred embodiment refers to a two-piece pocket for use on airline trays. FIG. 1 shows the view of the pocket 10 just as it is to be secured to the tray 12 that is located on the back of an airline seat 14. When not in use the tray 12 is secured to the seat 14 through a securing means 16 such as a knob that can be turned to actuate and/or release the tray 12.

To secure the pocket 10 to the tray 12, the tray 12 must first be released from the seat 14 by actuating the knob 16. Once released, the tray 12 moves from an upright vertical position to a horizontal position. In FIG. 1, the tray 12 is intermediate between these two positions.

The two piece pocket 10 is a singular device that includes a first pocket 18 that conforms to the dimensions of the tray 12. The first pocket 18 includes a front face 20, a rear face 22, three sidewalls 24a, 24b, 24c and an opening 26 that together define an interior space 28. The front face 20 of the first pocket 18 includes a space 30 that could be used for advertising space.

Along one side of the opening 26 is a seam 32 that is attached to a second pocket 34. The second pocket 34 includes a face 36, a rear portion 38, three sidewalls 40a, 40b, 40c and an opening 42 that is adjacent the connection seam 32. It is to be understood that there is not required a seam 32 that connects the pockets. The device could be one continuous piece where the first pocket folds over one side and the second pocket folds over the side and there is no seam connecting the two.

Figure 2:
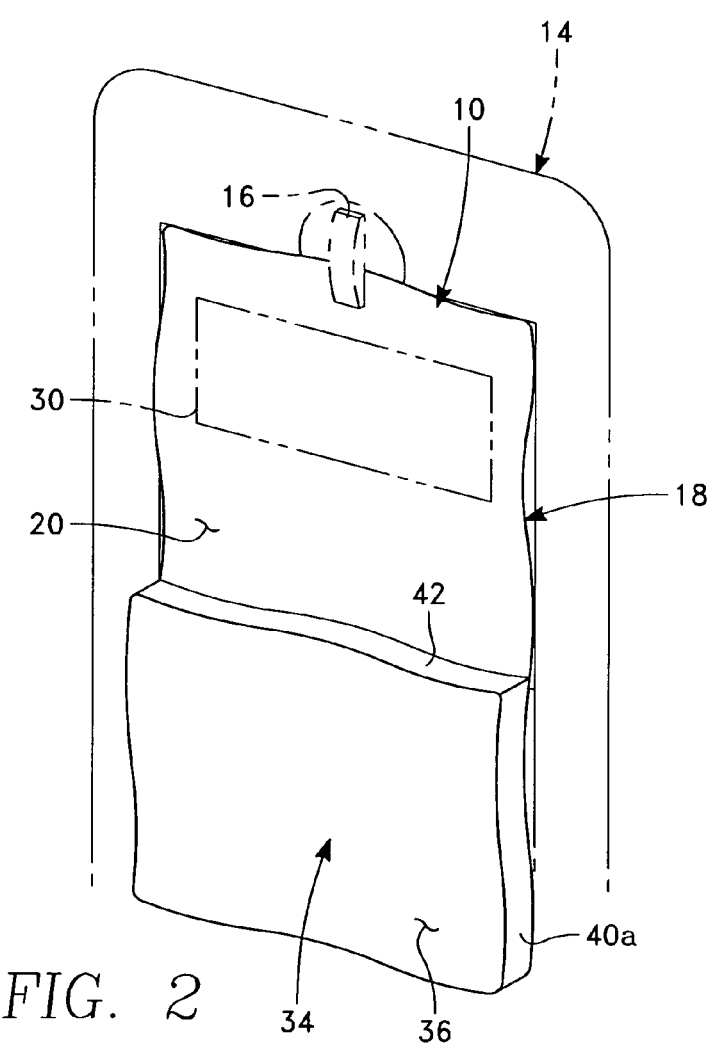
FIG. 2 is a perspective of the invention in use with the tray in the upright position.

As seen in FIG. 1, the opening 26 of the first pocket 18 slips onto the tray 12. Once the first pocket 18 is attached the tray 12, the tray 12 can then be used in either of its two positions. In either position, the opening 42 is easily accessed by the traveler. The upright vertical position is illustrated in FIG. 2. In this position, the opening 42 of the second pocket 34 is further exposed and can be easily visible by the traveler for the placement therein of personal items or retrieval therefrom of same.

Figure 3:
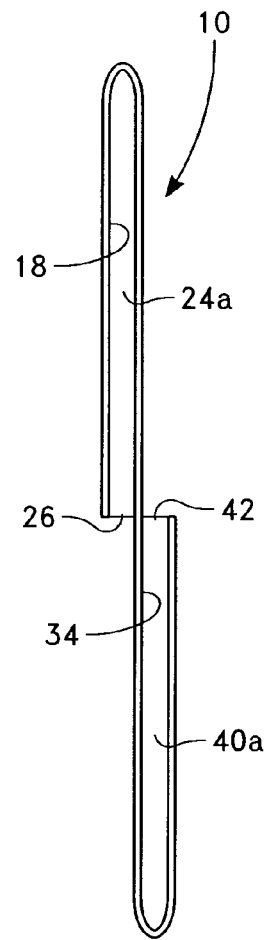
FIG. 3 is taken along the line 3-3 in FIG. 1.

In FIG. 3, the side view illustrates the access to the opening 42 in the second pocket 34.

Figure 4:
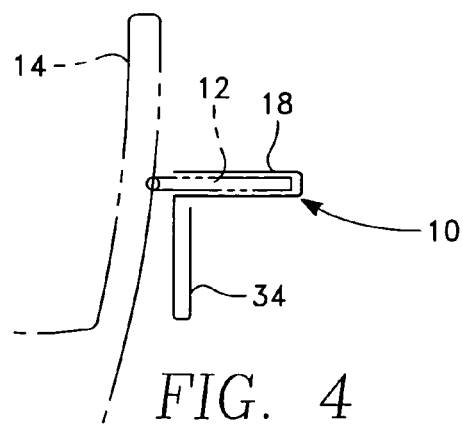
FIG. 4 is a side view of the tray table in the horizontal position and with the apparatus secured thereto.
Figure 5:
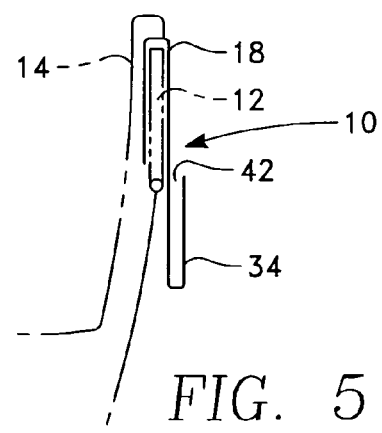
FIG. 5 is a side view of the tray table in the upright vertical position and with the apparatus secured thereto.

FIG. 4 shows the device 10 on the tray 12 while the tray 12 is its horizontal position. In this position, the second pocket 34 is still accessible, but the first pocket 18 now becomes accessible. The first pocket 18 covers the tray 12 providing a fresh tablecloth for the traveler. Optionally, any sorts of designs can be placed on the first pocket 18 so that when the user has placed the tray 12 in the horizontal position, the surface can be used for board games or just for the placement of images that are pleasing to the traveler.

The device can be made of a stretchy material so that the pocket can expand as far as the material will allow, but it is not limited to stretchy material. The item is washable and reusable to the traveler has complete peace of mind with regard to the sanitary nature of the tray and the pocket while traveling. Furthermore, it is to be understood that the device of the instant invention is not limited to use on airplanes. The device can easily be put on the headrest of the seat the airplane traveler is sitting in by slipping the top pocket over the seat, thereby providing sanitary protection to the traveler's head. Furthermore, the device can be used in alternative settings, including, but not limited to the headrest of a car or the tray table on a train or bus. Additionally, additional pockets could be sewn onto any of the faces on the device for more storage.

The discussion included in this patent is intended to serve as a basic description. The reader should be aware that the specific discussion may not explicitly describe all embodiments possible and alternatives that are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A sanitary protective cover for placement over a tray, comprising:
   a. a first pocket made of stretchy material and configured to slide onto the tray, the first pocket having
      i. a front face,
      ii. a rear face, opposite and operatively connected to the front face,
      iii. a first side region adjacent to the front face and the rear face,
      iv. a second site region opposite the first side region and adjacent to the front face and the rear face,
      v. a closed end region adjacent to and operatively connected to the front face, the rear face, the first side region, and the second site region, wherein the front face, the rear face, the first side region, the second side region, and the closed end region define an interior space, and
      vi. an opening opposite the closed end region leading into the interior space, the opening defining a first plane, the first plane being transverse to the front face; and
   b. a second pocket having
      i. a front face,
      ii. a rear face, opposite and operatively connected to the front face,
      iii. a first side region adjacent to the front face and the rear face,
      iv. a second side region opposite the first side region and adjacent to the front face and the rear face,
      v. a closed end region opposite the closed end region of the first pocket, and adjacent to and operatively connected to the front face, the rear face, the first side region, and the second side region of the second pocket, wherein the front face, the rear face, the first side region, the second side region, and the closed end region of the second pocket define an interior space of the second pocket, and vi. an opening opposite the closed end region of the second pocket leading into the interior space of the second pocket, the opening defining a second plane, the second plane being transverse to the front face, c. wherein the opening of the first pocket and the opening of the second pocket are separated by the front face of the first pocket and the rear face of the second pocket, and d. wherein the first plane and the second plane are coplanar.

2. The protective covering of claim 1, wherein the rear face of the first pocket comprises images for playing a board game.

3. The protective covering of claim 1, wherein the front face of the first pocket comprises an advertising space.

4. The protective covering of claim 1, wherein the protective covering is reversible.

5. The sanitary protective covering of claim 1, wherein the rear face of the first pocket does not contain a line of weakness that is torn when the protective covering is stretched.

6. A method of providing a combination of a sanitary surface on a tray and an additional storage compartment in a vehicle, the method comprising:

a. obtaining a protective covering, comprising
  i. a first pocket configured to slide onto the ray, the first pocket having
    (a) a front face,
    (b) a rear face, opposite and operatively connected to the front face,
    (c) a first side region adjacent to the front face and the rear face,
    (d) a second side region opposite the first side region and adjacent to the front face and the rear face,
    (e) a closed end region adjacent to and operatively connected to the front face, the rear face, the first side region, and the second side region, wherein the front face, the rear face, the first side region, the second side region, and the closed end region define an interior space, and
    (f) an opening opposite the closed end region leading into the interior space, the opening defining a first plane, the first plane being transverse to the front face; and
  ii. a second pocket having
    (a) a front face,
    (b) a rear face, opposite and operatively connected to the front face,
    (c) a first side region adjacent to the front face and the rear face,
    (d) a second side region opposite the first side region and adjacent to the front face and the rear face,
    (e) a closed end region opposite the closed end region of the first pocket, and adjacent to and operatively connected to the front face, the rear face, the first side region, and the second side region of the second pocket, wherein the front face, the rear face, the first side region, the second side region, and the closed end region of the second pocket define an interior space of the second pocket, and
    (f) an opening opposite the closed end region of the second pocket leading into the interior space of the second pocket, the opening defining a second plane, the second plane being transverse to the front face,
    (g) wherein the opening of the first pocket and the opening of the second pocket are separated by the front face of the first pocket and the rear face of the second pocket, and
    (h) wherein the first plane and the second plane are coplanar;

b. stretching the first pocket without tearing any portion of the first pocket;

c. sliding the stretched first pocket over the tray; and d. releasing the first pocket, whereby the first pocket conforms to the tray.

7. The method of claim 6, wherein the rear face of the first pocket comprises images for playing a board game.

8. The method of claim 6, wherein the front face of the first pocket comprises an advertising space.

* * * * *